July 31, 1934.  L. E. GOULD  1,968,293
FUEL FEED SYSTEM
Filed Feb. 18, 1933  2 Sheets-Sheet 1
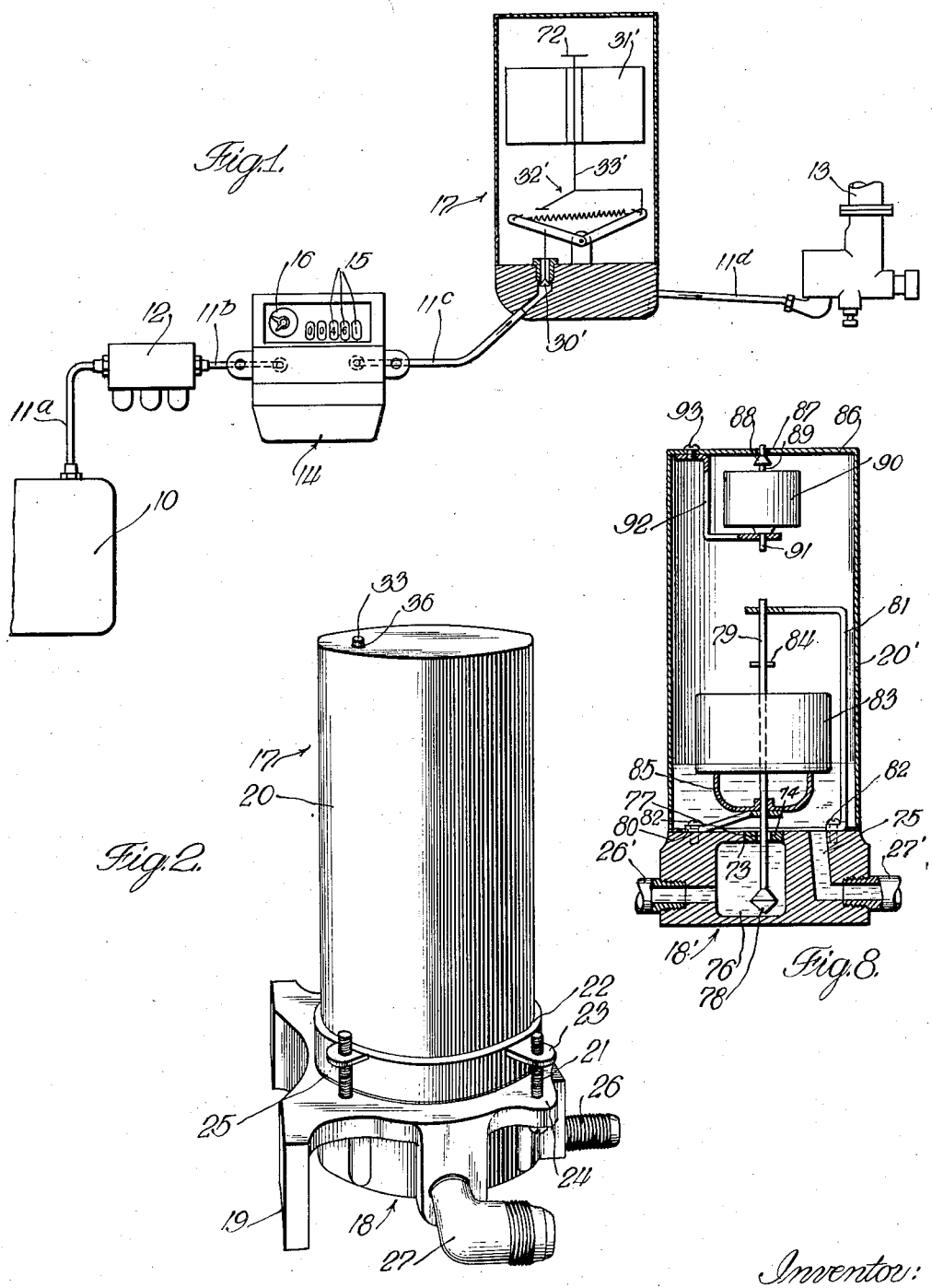
Inventor:
Lawrence E. Gould
By Brown, Jackson, Boettcher + Dienner
Att'ys.

July 31, 1934.    L. E. GOULD    1,968,293
FUEL FEED SYSTEM
Filed Feb. 18, 1933    2 Sheets-Sheet 2
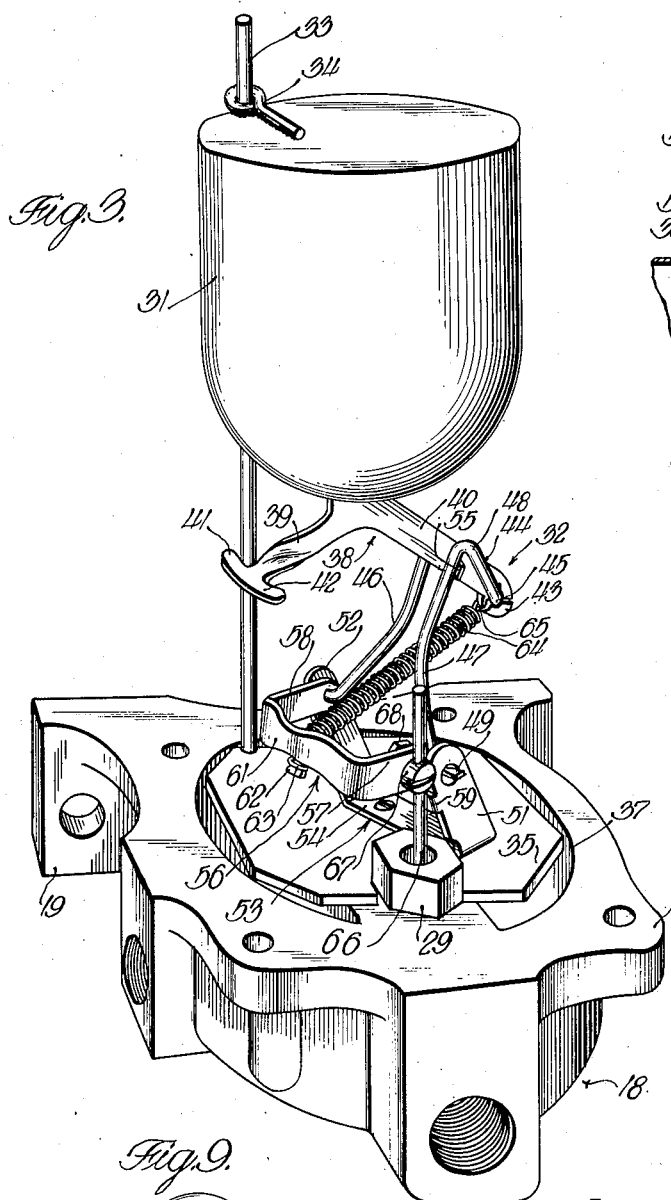

Patented July 31, 1934

1,968,293

UNITED STATES PATENT OFFICE 1,968,293

FUEL FEED SYSTEM

Lawrence E. Gould, Chicago, Ill., assignor to Economy Electric Devices Co., Chicago, Ill., a corporation of Illinois Application February 18, 1933, Serial No. 657,382

15 Claims. (Cl. 73—167)

The present invention relates to fuel metering apparatus or systems such as are employed in motor trucks, buses, and other self-propelled vehicles for indicating or registering the consumption of liquid fuel used in their propulsion. The invention is principally concerned with fuel metering systems of the type employing a fuel pump as the flow creating means, or operating under gravity or force feed flow, and having a flow meter disposed in the fuel line extending between the supply tank and the point of use, such flow meter registering the amount of liquid fuel used, and thereby indicating the operating efficiency of the vehicle and of the driver.

I have found that in the majority of these fuel metering systems, as heretofore constructed, an appreciable error is introduced in the registration of the meter owing to the fact that the rate of fuel flow therethrough varies through a relatively wide range. While the fuel pump, air pressure or gravity head in such systems serves to promote substantially constant pressure at the carburetor under all operating conditions and all rates of discharge, they do not provide, however, for passing the fuel through the meter in such volume as to assure correct operation of the meter at all times. The reason for this is that actual delivery of fuel to the carburetor is controlled by the carburetor float valve, which shuts off the flow of fuel to the carburetor float bowl when the fuel level in said bowl is at a predetermined height. Such valve is constantly rising and falling in an effort to maintain the fuel in the carburetor bowl at a predetermined level, and the result is that the volume of fuel passing through the meter will be gradually increased and reduced correspondingly with the rising and falling of the float controlled valve of the carburetor.

The meters employed in the above described systems are usually of the displacement type, and it is well known that the accuracy of registration of such meters is subject to considerable variation with varying rates of flow therethrough. That is, meters of the displacement type are subject to a certain amount of slippage and leakage of fuel therethrough. At high speeds of the meters this leakage or slippage of fuel therethrough is practically negligible and the meters are quite accurate in their registration. However, as the speed of the meter decreases, due to a decrease in the volume of fuel flow therethrough, the slippage and leakage expressed in percentage of total flow of fuel through the meter increases and becomes relatively high at extremely low speeds of the meter. Those meters that are accurately calibrated to a large volume of flow therethrough, therefore, will not operate accurately when the demand falls below a certain point. Consequently, when a meter adapted to operate accurately upon relatively high engine speeds is employed under the conditions outlined above, an appreciable amount of fuel will be allowed to slip or leak past the displacement element of the meter at certain times and will not be registered accurately thereby. This is particularly true when the demand falls below a certain point, as for example, when the engine is running at idling speeds. Under such conditions, the rise and fall of the carburetor float valve is necessarily within relatively small limits and the rate of flow through the meter will, therefore, be correspondingly small. Consequently, where a meter is adapted to register accurately the rate of flow therethrough, caused by the relatively high speed of the engine, it will not register accurately such low rate of flow. The failure to register correctly such small rates of flow detracts greatly from the proper determination of the operating efficiency of the vehicle and of the driver.

Broadly stated, the principal object of the present invention is to avoid the above difficulties by providing improved means whereby fuel may be passed through the meter at an aproximately constant rate, thereby reducing to a minimum inaccuracies of the meter in registering the passage of fuel therethrough. Otherwise stated, it is an object of the invention to provide improved means which will insure that the meter will always operate at the substantially flat part of its registration curve, the aforesaid approximately constant rate of flow being chosen to correspond substantially to the 100% accuracy point lying in said flat portion of the registration curve. More specifically, the improved means, herein termed an accumulator, comprises a chamber interposed in the system between the meter and the carburetor for the purpose of storing a quantity of fuel. The fuel is pumped through the meter into the accumulator and is fed to the carburetor directly from the accumulator. The quantity of fuel pumped into the accumulator is governed by a float controlled valve. In one embodiment of the invention, the float is connected to the valve by means of a toggle arrangement such that the valve will be caused to open or close with a "snap" action at predetermined times. In a modified form of the invention, the float is also adapted to rise and fall with the increase and decrease in the level of liquid within the accumulator and is adapted to open the valve only at predetermined limits of its movement, but without employing a toggle mechanism. By reason of such arrangements, the valve within the accumulator is not constantly rising and falling in the manner that the float controlled valve in the carburetor bowl does. Instead, the valve remains closed and the float gradually falls with the lowering of the level of fuel in the accumulator until the fuel reaches a certain predetermined low level, at which time the valve is quickly opened substantially to its maximum degree. Fuel may then be pumped through the meter and into the accumulator, the float within the accumulator gradually rising with the rising level of fuel therein until it reaches a predetermined high level, whereupon the valve is again quickly moved to fully closed position. Through such an arrangement it will be apparent that upon opening of the valve within the accumulator, fuel may be pumped through the meter into the accumulator at a substantially constant rate of flow until the valve again closes, this substantially constant rate corresponding approximately to the 100% accuracy point on the flat portion of the registration curve of the meter, thereby assuring accurate registering of the fuel passing through the meter. The flow of fuel from the accumulator to the carburetor is, of course, governed by the carburetor float valve. Such valve, however, does not have any effect upon the rate of flow of the fuel being pumped into the accumulator, except that it merely lowers the level of fuel therein and thereby permits the float within the accumulator to open the valve which admits fuel to the accumulator.

Other objects and advantages of the invention will appear from the following detailed description taken in connection with the accompanying drawings, in which:

Figure 1 is a diagrammatic view of a fuel feed system, employing a fuel pump for feeding the fuel to a point of use, and illustrating my improved accumulator in conjunction with a flow meter interposed in the system;

Figure 2 is a perspective view of my improved accumulator;

Figure 3 is a perspective view of one form of the accumulator with the chamber thereof removed and showing the toggle mechanism for snapping the valve to open and closed positions;

Figure 4 is a fragmentary vertical sectional view through the lower portion of the construction illustrated in Figure 3;

Figures 5, 6 and 7 are perspective detail views of the principal parts of the toggle mechanism illustrated in Figure 3;

Figure 8 is a vertical sectional view through an accumulator showing a modified arrangement of float controlled valve;

Figure 9 is an elevational view, partly in section, illustrating a further modified arrangement of float controlled valve; and Figure 10 is a chart showing the registration curve of a typical meter, with and without the accumulator.

The conventional fuel feed system illustrated in Figure 1 comprises the main supply tank 10 usually located at the rear of the vehicle, the fuel feed line leading therefrom, represented by the four sections of conduit 11a, 11b, 11c and 11d, the carburetor 13, and the conventional fuel feed pump, generally indicated at 12.

The fuel pump 12 may be of any of the well known mechanically operated, diaphragm operated or electrically operated types of pumps now commonly employed for feeding fuel to the carburetor of an internal combustion engine. The construction and operation of these fuel pumps are well known and need not be described here in detail. It will also be understood that the flow of the fuel might be caused in other ways, such as by air pressure or a gravity head.

Interposed in the fuel feed line is the flow meter, which is indicated in its entirety at 14. Such meter may be of any desired construction, the preferred form illustrated being of the registering or cyclometer type comprising a displacement type of measuring chamber connected in the fuel feed line with a rotating element in the chamber responsive to the flow of fuel therethrough.

Said rotating element is operatively connected to drive the cyclometer wheels 15 which indicate the gallons and fractions of a gallon consumed in the operation of the vehicle. A tank dial 16, having a resettable pointer, may also be provided on the instrument for indicating the quantity of fuel remaining in the main supply tank 10.

Referring now to the means which I provide to avoid the erroneous registrations frequently occurring in these flow meters through the inability to maintain a constant rate of flow therethrough, it will be seen that interposed in the fuel feed line is the accumulator 17. As shown in Figures 2 and 3, such unit comprises a base or body portion 18 to which all of the conduit connections are made. Projecting from this base are bracket lugs or extensions 19 by which the device may be mounted on the front part of the dash or at any convenient point of support on the vehicle. Supported upon this base is an upwardly extending chamber 20, which may be either formed of metal or of glass, and which is removably secured to the cap by means of screws 21. This chamber is substantially closed at its upper end, with an atmospheric vent provided therein, however; and adjacent to its lower open end is provided with an outwardly projecting annular bead or flange 22. This bead or flange is provided with threaded lugs 23 at spaced points about its circumference. The screws 21 pass upwardly through apertured lugs 24 formed on the base and tap into the threaded lugs 23, drawing the lower edge of the chamber 20 against a sealing gasket 25, which is interposed between the upper surface of the base 18 and the lower edge of the chamber 20. It will, of course, be apparent that the chamber 20 can be secured and sealed to the base 18 in any other suitable or preferred manner, without in any way departing from the spirit of the present invention.

Inlet communication to the base 18 and to the chamber 20 is through a nipple 26 which connects with the conduit section 11c and screws into the side of the base. Outlet communication from the base and from the chamber 20 is through a nipple 27 which preferably extends outwardly from the base substantially at a right angle to the inlet connection 26 and is adapted for connection with the conduit section 11d leading to the carburetor 13. The nipple 26 communicates with a vertical bore 28 formed in the base 18, and screwing into the upper end of this bore is a bushing 29 which extends downwardly therein. An extension sleeve 29' on the lower end of this bushing provides a seat for a valve 30, which governs the admission of fuel into the base 18 and thence into the chamber 20.

Opening and closing movement of the valve 30 is controlled by a float 31 which is connected to the valve through a toggle arrangement, indicated generally at 32. This float is guided for vertical movement within the chamber 20 by a vertically extending rod 33 which passes through an eyelet 34 suitably secured to the upper surface of the float. At its lower end the rod 33 is rigidly secured to a plate 35, and at its upper end the rod extends into an aperture 36 formed in the top wall of the chamber 20, this aperture also serving as an air vent for said chamber.

In a later described embodiment, I have shown a safety device for closing the atmospheric vent to prevent possible overflow in the event of an abnormal condition, which safety device may or may not be used in any of the embodiments herein described. Where no safety device controls the atmospheric vent 36, atmospheric pressure prevails at all times within the chamber 20, and even where this safety device is used, atmospheric pressure prevails within the chamber 20 under all normal operating conditions.

The plate 35 is rigidly secured within the open portion 37 of the base 18 in any suitable or preferred manner, and serves to support the toggle mechanism 32. This toggle mechanism includes a member 38, suitably secured to the bottom wall of the float 31, and comprising oppositely extending arms 39 and 40. The outer end of the arm 39 of member 38 is provided with lugs or ears 41 and 42, which extend outwardly at right angles from opposite sides of said arm for a purpose which will be hereinafter described. At its rearward end, the arm 40 of member 38 is provided with a downwardly extending ear or lug 43, which lug is provided with an aperture for the reception of a member 44.

Member 44 comprises a single length of spring wire which is bent back upon itself at 45, to form two arms, 46 and 47, these arms being spaced apart by the bent portion 45. Each of the arms adjacent the bent portion 45 is also bent downwardly at 48 and forms an angle slightly less than a right angle with said arms. The arms extend forwardly from the bent portion 48 thereof in substantially the same plane and parallel to each other to a point approximately midway of their length, where they diverge outwardly so that when viewed, for example, in plan, the member 44 appears of substantially Y-shaped configuration. The extreme forward ends of the arms 46 and 47 are also bent at substantially right angles to the main body portion thereof to form end portions 49 and 50, respectively. These end portions 49 and 50 are journaled in apertures formed in the outer ends of arms 51 and 52, respectively, of a substantially U-shaped member 53, the transverse portion 54 of which seats upon and is rigidly secured to the plate 35.

The bent portion 45 of member 44 extends through the aperture in the ear 43 of arm 40, which is disposed in the space between the arms 46 and 47. It will be apparent, therefore, that upward movement of the float will carry the arm 40 therewith and, as the member 44 is connected to said arm through the ear 43 and bent portion 45 of member 44, such member will be caused to swing in an arc of which the ends 49—50 of said member constitute the axis. A lug 55, suitably formed on the arm 40, substantially midway of the ends thereof, is adapted to engage in the angle formed by the arm 47 and bent portion 48 of member 44 and to thus limit upward movement of member 44 and float 31.

A second substantially U-shaped member 56 has its arms 57 and 58 journaled at their outer ends upon the end portions 49 and 50 of member 44. This member 56 is adapted to swing in an arc about the end portions 49—50 of member 44 as a center and is limited in its downward movement by engaging inturned lugs 59 and 60 formed on the arms 51 and 52, respectively, of member 53. The transverse portion 61 of member 56 is provided with a forwardly inclined lug 62, this lug engaging in a loop 63 formed at one end of a tension spring 64. The other end of the spring 64 is also provided with a loop 65 which is hooked in the aperture formed in the ear 43 of arm 40, the spring thus connecting member 56 with the arm 40 for the purpose of imparting a snap motion to the valve, as will hereinafter appear.

The valve 30, for controlling the flow of fuel into chamber 20, is actuated from member 56 by means of a rod 66. This rod may be suitably guided for an ordinary pushing contact against the top of the ball valve 30, or it may be affixed to the valve so as to be a part thereof. Said rod passes upwardly through the bushing 29 and its upper end extends through an apertured bolt 67, which has pivotal mounting in arm 57 of member 56, said bolt being secured to said arm by a nut 68. The valve rod 66 may be secured fast in the bolt 67 (as shown in Figure 3), or it may be capable of turning therein, with collars 66a secured to the rod above and below the bolt (as shown in Figure 4) for transmitting motion to the rod, the latter arrangement permitting rotation of the valve to different seating contacts. A spiral compression spring 69 is confined between the lower surface of the valve 30 and the bottom wall 70 of the vertical bore 28 and serves to urge the valve to closed position. Where the valve is a loose ball separate from the rod 66 it may be desirable to screw a threaded pin 71 up into the inner end of the bore which receives the nipple 26 so as to prevent accidental displacement of the ball from its seat, this pin being removed when the ball is to be removed.

The operation of the embodiment shown in Figures 1 to 3 is as follows, the parts hereinbefore described being approximately in the position shown in Figure 3 when the fuel in the chamber 20 is at its predetermined high level and the valve 30 is closed: Under operating conditions, fuel is fed from chamber 20 to the bowl of the carburetor 13, the amount of fuel admitted to said bowl being governed, of course, by the carburetor float valve. As the level of fuel in chamber 20 is gradually lowered, the float 31 is also gradually lowered until the valve 30 is snapped open.

Valve 30 is snapped to open or closed position by means of the toggle arrangement 32, which comprises the above described members 44 and 56, the knuckle pivots 49—50 and the tension spring 64. It will be noted that when the above parts are in the position illustrated in Figure 3, the direction of pull of the spring 64 acts along a line which lies above the knuckle pivots 49—50. The result is that the spring 64 tends to revolve the member 56 upwardly above its pivots and to hold the valve 30 in closed position, the valve 30 abutting the lower edge of the sleeve 29' and limiting the upward movement of said member. However, as the float 31 is lowered by the gradual lowering of the level of fuel in chamber 20 the arm 40 of member 38 forces member 44 downwardly about its pivots 49—50 until the direction of pull of the spring 64 acts along a line which lies slightly below the knuckle pivots 49—50. The toggle is then broken by tension spring 64, which revolves member 56 downwardly about its pivots 49—50 and snaps the valve 30 to open position. Should the toggle fail to break at the point hereinbefore indicated, due, for example, to breakage of spring 64 or possibly to some temporary abnormal pressure of the fuel on the lower side of the valve 30, the ears or lugs 41—42 will engage the transverse portion 61 of member 56 and the combined weight of the float 31 and arm 38 will serve to force valve 30 to open position. There will, therefore, be no stoppage of fuel flow even if the spring 64 should be broken.

Fuel is then pumped into chamber 20 by the fuel pump 12. As the level of fuel in chamber 20 gradually rises the float 31 also gradually rises, carrying with it members 38 and 44, until the line of pull of the spring 64 assumes a position slightly above the knuckle pivots 49—50. At such time the spring 64 again becomes effective to break the toggle in a reverse direction and to swing member 56 upwardly about its pivots 49—50 to close valve 30.

It is to be particularly noted that the valve 30 is snapped to open or closed position only at a predetermined low or high level of the fuel in chamber 20. The valve is not constantly opening and closing, which would result in a varying rate of flow of fuel admitted to the accumulator. By reason of the valve 30 being snapped to wide open position at only a predetermined low level of the fuel within chamber 20, fuel may be immediately pumped into said chamber at sufficient pressure and at sufficient volume to assure accurate registration of all the fuel passing through the meter. Furthermore, with such a snap motion of the valve to either of its two positions there is no interval when the valve might permit the fuel pump to pump only at a slow rate of flow through the meter which would not be registered accurately. It will be noted that when the valve 30 is in its closed position the pump pressure will assist in holding said valve closed.

While I have shown only one rod 33 for guiding the float 31, it will be apparent that more than one rod can be employed, if desired. In the slightly modified embodiment diagrammatically ilustrated in Figure 1, the toggle mechanism 32' is substantially the same as the previously described toggle mechanism, with the exception that an actuating rod 33' carried by the toggle mechanism 32' may be employed to guide the float. In such case, the rod 33' would pass through the float 31' substantially centrally thereof, and the float would have vertical movement with respect to said rod. The weight of the float seating on the toggle mechanism would serve to break the toggle to snap the valve 30' to open position, while the float contacting the stop 72, secured to the upper end of the rod 33', would serve to carry said rod upwardly, with further increase in the level of the fuel within the chamber, and break the toggle in a reverse direction to snap the valve 30' to closed position.

Referring now to the embodiment shown in Figure 8, this modified construction also comprises a base 18', to which the conduit connections are made. Said base is of substantially the same configuration as the base 18 of the device of Figures 1 to 3, and is adapted to support a chamber 20' thereon, this chamber also being secured to said base in substantially the same manner as has been described in connection with the aforementioned embodiment. Inlet communication to the base is through a nipple 26', which screws into the side of the base, and outlet communication from the base is through a nipple 27' extending from the opposite side of the base 18' and screwing thereinto. This latter nipple communicates with an upwardly extending bore 75 which opens into the chamber 20'. Nipple 26' has communication with a chamber 76 formed in the base 18', and this chamber 76 is provided with an opening 73 into which is threaded an annular member 74 having an inlet opening 77 for communication with the interior of the chamber 20'. The lower edge of the inlet opening 77 provides a seat for a valve 78, which governs the admission of fuel into the chamber 20'.

This valve is preferably tapered as shown, and is formed on one end of a vertically disposed rod 79, which extends through the inlet opening 77 and into the chamber 20'. Said valve either has a relatively wide range of movement or is otherwise so constructed and arranged that when it is in its open position the flow up through the passage 77 will have no tendency or only a minimum tendency to close the valve.

The rod 79 is disposed substantially centrally of the chamber 20' and is adapted to have vertical movement therein for opening and closing the valve 78. The rod is guided in such movement by means of suitable guides 80 and 81, which extend upwardly from the base 18', and to which they are secured by screws 82. The rod 79 passes through apertures formed in the free ends of said guides. Rod 79 also extends through a bore formed substantially centrally of a float 83, this float serving to control the opening and closing movements of valve 78. The float 83 is mounted on rod 79 for vertical movement with respect thereto and is limited in its upward movement along said rod by a stop 84 secured to the rod 79 adjacent to the upper portion thereof. The float is limited in its downward movement by a cup 85, which is fixedly secured to the rod 79 adjacent to the lower portion thereof. The cup 85 is of such weight that it is slightly heavier than buoyance when filled with fuel, and is for a purpose which will hereinafter appear.

The upper wall 86 of chamber 20' is provided with an air vent 87 which is adapted to be closed by a valve 88, for a purpose which will hereinafter appear. The valve is formed adjacent one end of a rod 89 and is preferably tapered as shown. Preferably, the rod extends for a short distance above the valve 88, and through the air vent 87 for guiding the valve in its movement from open to closed position.

Opening and closing movement of this valve is controlled by a float 90 which imparts movement to the rod 89, the rod extending through the float substantially centrally thereof. The float may be fixedly secured to said rod or may have sliding movement thereon between end stops on the rod. The rod also extends for a short distance below the float 90, as indicated at 91, and through an aperture formed in one end of a substantialy Z-shaped arm 92. The other end of the arm member 92 is fixedly secured to the inner surface of the wall 86 of chamber 20', as by means of the screw 93, and serves to support the float 90 and valve rod within the chamber 20'.

The operation of the above described embodiment is as follows, the parts hereinbefore described being in approximately the position shown, when the fuel in the chamber 20' is at its predetermined low level with the valve 78 open. Under such conditions fuel from the fuel pump is pumped through the nipple 26' into the chamber 76 and thence through inlet opening 77 into chamber 20'. The float 83, which it will be noted is at this time resting upon the upper periphery of the cup 85, gradually rises along the rod 79 with the rise of the level of the fuel within chamber 20', until it contacts the stop 84 formed on the rod 79. Further pumping of fuel into chamber 20' will continue to raise the float 83, and this float, through its engagement with the stop 84 on rod 79, will then carry the rod 79 upwardly and close the valve 78. The pump pressure aids in closing the valve.

Fuel is fed from the chamber 20' through the vertical bore 75 to the nipple 27' and thence to the carburetor 13. Such feeding of the fuel to the carburetor 13 will serve to lower the level of the liquid within the chamber 20', the float gradually dropping down along the rod 79. The pressure of the fuel in chamber 76 acting upwardly against the valve 78 will serve to hold such valve closed until the float, in its downward movement, contacts the upper periphery of the cup 85, when the weight of the float will serve to open the valve 78 and again admit more fuel to chamber 20'. The cup 85 aids in opening the valve 78 in the event that the engagement of the float against the upper edge of the cup does not open the valve. For example, with continued lowering of the fuel level down below the top of the cup, the weight of the cup and the weight of the fuel contained therein become increasingly effective to aid the weight of the float, until the valve 78 is forced open.

The function of the float controlled vent valve 88 is that of a safety device to take care of the possible abnormal condition which might arise should the fuel valve 78 fail to close completely under the lifting action of the float 83. That is to say, this vent valve 88 would close the air vent 87, and thereby prevent fuel overflowing therethrough should the valve 78 accidentally fail to close and the chamber 20' become filled with fuel. This failure of valve 78 to close is a very remote possibility but might be caused, for example, by particles of dirt becoming lodged between the valve and its seat, or by reason of uneven wear of the valve or valve seat, or for other possible reasons. When such a condition occurs, and the float controlled valve 88 is not employed, it will be apparent that fuel will leak past the valve 78 into chamber 20', under pressure, and, where the rate of fuel flow from the chamber 20' is less than the rate of leakage of the fuel into said chamber, as for example, when the engine is running at idling speeds, the level of fuel within chamber 20' will gradually increase until the chamber becomes filled and the fuel overflows through the air vent 87. On the other hand, by employing the float controlled valve 88, the leakage of fuel into the chamber 20', under the conditions outlined above, will result merely in an increase in the level of fuel within said chamber until such time as the fuel level reaches the float 90, whereupon a further increase in the fuel level will move such float upwardly and with it the valve 88, thereby closing the air vent 87. Still further leakage of fuel into the chamber 20' will then occur only until such time as the chamber becomes filled with fuel, or until such time as the pressure of any air which might be entrapped and compressed within the upper portion of the chamber by the closing of air vent 87, together with the weight of the fuel, will equal the pressure under which the fuel is being pumped into said chamber. The closing of the air vent 87 will prevent any overflow of fuel therethrough, but the accumulator will still function to supply fuel to the carburetor 13, so long as this abnormal condition continues, although the meter registration may not be accurate during said abnormal condition. As soon as the fuel valve 78 is capable of resuming a normal seating on its valve seat 77 the parts will resume their normal operation, with the vent valve 88 in its continuously open position. During all periods of such normal operation, atmospheric pressure continuously prevails within the chamber 20'. It will be apparent that the float controlled valve 88 may also be employed in connection with the device of Figure 1, without in any way departing from the spirit of the present invention.

In Figure 9 I have illustrated a modified form of float and valve arrangement suitable for use in the device illustrated in Figure 8. In this case, the float 83' is in the form of a ball and is provided with a downwardly extending lug or ear 94, this ear being connected by a chain 95 with a similar ear 96 formed on the upper surface of the bottom wall of cup 85'. The valve 78' is formed on one end of a rod 97, and the other end of this rod is connected to the under surface of the cup 85'.

The construction of the accumulator with which this device is adapted to be used is substantially the same as that disclosed in Figure 8, except that in this case the upper guide 81 will be unneecssary. A lower guide, similar to the guide 80, will guide the rod 97. The operation of the modified form of float and valve arrangement is substantially the same as that disclosed in connection with the float and valve arrangement disclosed in Figure 8, except that in the instant case the relative movement between the float and valve is governed by the chain. When fuel is pumped into the chamber 20', the float, which at this time will be resting upon the upper periphery of the cup 85', will merely rise and carry the chain with it until it tightens the chain, at which time it will serve to close the valve. Conversely, as the level of liquid in the chamber 20' falls, the pressure of the fuel in chamber 76 will serve to hold the valve 78' closed and the float 83' will gradually drop with the lowering of the level of liquid within chamber 20' and the chain 95 will become coiled within the cup 85' until the float 83' comes down into contact with the upper periphery of the cup 85', at which time the weight of the float will serve to open the valve, or the weight of the float plus the weight of all or a portion of the cup and its contained fuel, will open the valve.

The chart of Figure 10 illustrates graphically the operating curve of a meter employed in a system such as above described, and illustrates the effect of the accumulator upon such curve. Referring now to the chart, the horizontal abscissæ markings represent rates of flow in gallons per hour, the vertical ordinate markings represent the accuracy of the meter registrations in percentages, and the letter A indicates generally the operating curve of a meter in a system employing a fuel consuming device, the meter being geared to operate at approximately 100% efficiency upon a rate of fuel flow therethrough of fifteen gallons per hour. As has been pointed out, meters of the displacement type are quite accurate in registering fuel passing therethrough at relatively high speeds, so that where a meter is geared to register accurately at a rate of fuel flow of fifteen gallons per hour, and the demand through the meter remains at such rate of flow, the operating curve of the meter will be a substantially straight line. However, it is also known that as the speed of the meter decreases, due to a decrease in the volume of fuel flow therethrough, the fuel begins to slip or leak past the displacement element of the meter, and such slippage or leakage of fuel becomes extremely high at low speeds of the meter. In such case, the operating curve of the meter, for a gradually decreasing rate of fuel flow from that of fifteen gallons per hour, will be an abruptly descending curve, such as shown at B in the chart. It has been found, however, that by gearing the meter to operate accurately at a certain rate of flow, and by providing an accumulator of sufficient capacity to properly handle such rate of flow, that the descending curve B can be raised to form the straight line C. The operating curve of a meter employed with an accumulator will, therefore, be a substantially straight line, at all times, regardless of the flow demand of the fuel consuming device. The reason for this is, of course, that by employing the accumulator, the fuel consuming device merely receives its required amount of fuel from the accumulator, as hereinbefore pointed out, and has no influence whatsoever upon the flow of fuel through the meter. The fuel is pumped through the meter into the accumulator and, as the float controlled valve of the accumulator is only opened and closed at the predetermined high and low levels of fuel in the accumulator, which levels are preferably rather widely separated, the fuel may be pumped through the meter at a constant volume rate of flow. This constant volume rate of flow insures correct registration by the meter when such meter is geared to its highest efficiency with respect to such rate of flow, and the operating curve of the meter will then be a substantially straight line at all times, regardless of the demand created by the fuel consuming device.

While the constructions illustrated and described constitute what I regard as the preferred embodiments of my invention, it will be understood that the invention is not limited to the particulars of such construction. Also, while I have disclosed the present invention in connection with fuel engines employed on trucks, buses, etc., it will be apparent that the invention may be employed on stationary installations of fuel engines, fuel oil burners, etc., where extreme accuracy of fuel consumption indication is required.

What I claim is:

1. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between the meter and the point of use and having a fuel inlet port, a valve controlling the entrance of fuel into said chamber through said inlet port, a float in said chamber, means for causing said valve to be moved to closed and open positions by said float only when said float is moved through a relatively wide range of movement, and an atmospheric vent into said chamber for continuously maintaining atmospheric pressure in said chamber during all normal operating conditions of the apparatus.

2. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between the meter and the point of use and having a fuel inlet port, a fuel outlet port, and an air vent for continuously maintaining atmospheric pressure throughout said chamber during normal operating conditions, said outlet port being continuously open to said point of use whereby fuel may be withdrawn from said chamber at any time, a valve controlling said inlet port, and a float within said chamber and operatively connected to actuate said valve directly for controlling the admission of fuel to said chamber.

3. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between the meter and the point of use and having a fuel inlet port, a valve for controlling said port, a float confined within said chamber for controlling said valve, and means for transmitting motion mechanically from said float to said valve whereby said float is arranged to operate said valve at only two predetermined positions of said float within said chamber.

4. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between said meter and the point of use and having a fuel inlet port and an atmospheric vent for continuously maintaining atmospheric pressure only on the surface of the fuel within said chamber, a valve for controlling said port, a float confined within said chamber for rising and falling movement with respect to the increase or decrease, respectively, of the level of fuel therein, and means operatively connecting said float directly with said valve and operative to close or open said valve only at relatively widely separated high and low levels of the fuel within said chamber.

5. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between said meter and the point of use and having a fuel inlet port, a valve for controlling said port, a float confined within said chamber for rising and falling movement with respect to the increase or decrease, respectively, of the level of fuel within said chamber, and toggle mechanism connecting said float with said valve and operative to snap said valve to closed or open position only at relatively widely separated high and low levels of the fuel within said chamber.

6. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between said meter and the point of use and continuously open to atmosphere, a fuel inlet port opening into said chamber through which fuel may be admitted to said chamber, a valve for controlling said port, and means for controlling said valve comprising a float, and toggle mechanism connecting said float with said valve.

7. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between said meter and the point of use, said chamber having a fuel inlet port, a valve for controlling said port, a float for controlling said valve confined within said chamber for rising and falling movement with respect to the level of fuel therein, means operatively connecting said valve with said float, an atmospheric vent opening into said chamber, a valve for closing said vent, and a second float in said chamber operatively arranged to actuate said latter valve.

8. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between said meter and the point of use and having a fuel inlet port, a fuel outlet port, and an air vent, said outlet port being continuously open to said point of use whereby fuel may be withdrawn from said chamber at any time, a float confined within said chamber for rising and falling movement with respect to the level of fuel therein, a valve actuated by said float for controlling said fuel inlet port, a second float confined in said chamber, and a second valve actuated by said second float to close said air vent in response to abnormally high fuel levels in said chamber.

9. The combination with liquid fuel metering apparatus comprising a supply tank, fuel directing means including a conduit for conveying the fuel from said tank to a point of use, and a flow meter interposed in the conduit for measuring and indicating the quantity of fuel conveyed therethrough, of a chamber interposed in said conduit between said meter and said point of use and continuously open to atmosphere, a fuel inlet port for said chamber, guide means within said chamber and extending through said inlet port, a valve carried by said guide means for controlling said port, a float confined within said chamber and embracing said guide means and having rising and falling movement with respect to the level of fuel in said chamber and with respect to said guide means, and means disposed on said guide means on opposite sides of said float for contacting said float at its predetermined high and low level positions only within said chamber to close and open said valve, respectively.

10. The combination with liquid fuel metering apparatus comprising a supply tank, a fuel feed conduit for conveying the fuel from said tank to a point of use, and a flow meter interposed in the conduit for measuring and indicating the quantity of fuel conveyed therethrough, of a chamber interposed in said conduit between said meter and the point of use and having a fuel inlet port, a float controlled valve in said chamber for controlling said port, an air vent in said chamber, and means for closing said air vent only in response to the development of an abnormally high fuel level in said chamber.

11. The combination with liquid fuel metering apparatus comprising a supply tank, a fuel feed pump, a fuel feed conduit responsive to said fuel pump for conveying the fuel from said tank to a point of use, and a flow meter interposed in the conduit for measuring and indicating the quantity of fuel conveyed therethrough, of a chamber interposed in said conduit between said meter and the point of use, said chamber having an air vent therein which is continuously open during normal operating conditions of the apparatus, said chamber also having an inlet port for admitting fuel to said chamber, a valve for opening and closing said port, a float, motion transmitting means connecting said float with said valve for automatically causing said valve to move to closed or open positions only at relatively widely separated high and low levels of the fuel in said chamber, a valve for closing said air vent, and means for moving said latter valve to closed position only in response to an abnormally high fuel level in said chamber.

12. The combination with liquid fuel metering apparatus comprising a supply tank, a fuel feed pump, a fuel feed conduit responsive to said fuel pump for conveying the fuel from said tank to a point of use, and a flow meter interposed in the conduit for measuring and indicating the quantity of fuel conveyed therethrough, of a chamber interposed in said conduit between said meter and the point of use, said chamber having a fuel inlet port, a valve for governing the passage of fuel through said port into said chamber, a float in said chamber, means operatively connecting said float with said valve for opening and closing the latter, and a liquid containing cup connected with said valve for assisting in the closing of the latter.

13. The combination with liquid fuel metering apparatus comprising a supply tank, a fuel feed pump, a fuel feed conduit responsive to said fuel pump for conveying the fuel from said tank to a point of use, and a flow meter interposed in the conduit for measuring and indicating the quantity of fuel conveyed therethrough, of a chamber interposed in said conduit between said meter and the point of use, said chamber having a fuel inlet port, a valve for controlling said port, a float confined within said chamber for rising and falling movement with respect to the increase or decrease, respectively, of the level of fuel within said chamber, toggle mechanism connecting said float with said valve and including a spring operative to snap said valve to closed or open position at the predetermined high and low levels only of the fuel within said chamber, and means carried by said float to positively assure breaking of said toggle mechanism to move said valve to open position in the event of breakage of said spring.

14. The combination with liquid fuel metering apparatus comprising a supply tank, a fuel feed pump, a fuel feed conduit responsive to said fuel pump for conveying the fuel from said tank to a point of use, and a flow meter interposed in the conduit for measuring and indicating the quantity of fuel conveyed therethrough, of a chamber interposed in said conduit between said flow meter and the point of use, a base for supporting said chamber, a fuel inlet port in said base communicating with said chamber, a valve disposed in said inlet port for controlling admission of fuel to said chamber, a float confined within said chamber, and means operatively connecting said float with said valve.

15. The combination with liquid fuel metering apparatus comprising a supply tank, a fuel feed pump, a fuel feed conduit responsive to said fuel feed pump for conveying the fuel from said tank to a point of use, and a flow meter interposed in the conduit for measuring and indicating the quantity of fuel conveyed therethrough, of a chamber interposed in said conduit between said meter and the point of use and having an air vent continuously maintaining atmospheric pressure within said chamber, a base for supporting said chamber, a fuel inlet port in said base communicating with said chamber, a valve disposed in said inlet port for controlling admission of fuel to said chamber, a float confined within said chamber, and toggle mechanism supported by said base and confined within said chamber for operatively connecting said float with said valve.

LAWRENCE E. GOULD.